United States Patent
Inui et al.

(10) Patent No.: US 7,560,055 B2
(45) Date of Patent: Jul. 14, 2009

(54) METHOD OF MANUFACTURING AN OPTICAL MODULE

(75) Inventors: Yukitoshi Inui, Aichi (JP); Kazuhiro Terada, Aichi (JP); Minoru Komada, Aichi (JP); Takashi Maeno, Aichi (JP)

(73) Assignee: Toyoda Gosei Co. Ltd., Nishikasugai-gun (JP)

( * ) Notice: Subject to any disclaimer, the term of this patent is extended or adjusted under 35 U.S.C. 154(b) by 0 days.

(21) Appl. No.: 11/141,193

(22) Filed: Jun. 1, 2005

(65) Prior Publication Data
US 2005/0276545 A1  Dec. 15, 2005

(30) Foreign Application Priority Data
Jun. 2, 2004   (JP)  ............................ P2004-164084
Mar. 29, 2005  (JP)  ............................ P2005-095568

(51) Int. Cl.
    *B29D 11/00*   (2006.01)
(52) U.S. Cl. .................. 264/1.24; 264/1.36; 264/1.7
(58) Field of Classification Search ................ 264/1.24, 264/1.36, 1.38, 1.7, 1.9
See application file for complete search history.

(56) References Cited

U.S. PATENT DOCUMENTS 6,823,116 B2   11/2004   Inui et al.
2002/0114601 A1   8/2002   Kagami et al.
2002/0186935 A1   12/2002  Inui et al.
2003/0125408 A1   7/2003   Inui et al.
2004/0131320 A1   7/2004   Inui et al.

FOREIGN PATENT DOCUMENTS

| EP | 1 211 529 A | 6/2002 |
| EP | 1 271 195 A | 1/2003 |
| EP | 1 284 426 A | 2/2003 |
| JP | 59-223408 | 12/1984 |
| JP | 2002-169038 | 6/2002 |
| JP | 2002-365459 | 12/2002 |
| JP | 2004-149579 | 5/2004 |

OTHER PUBLICATIONS

European Search Report dated Aug. 12, 2005.

*Primary Examiner*—Mathieu D. Vargot
(74) *Attorney, Agent, or Firm*—McGinn IP Law Group, PLLC

(57) ABSTRACT

There is provided a method of manufacturing an optical module comprises a component fixing step in which an optical waveguide and at least one optical device are detachably held by a fixing member capable of holding an uncured light curable resin in a required position, and a core forming step in which light of a wavelength for curing the light curable resin is emitted from the leading end of the optical waveguide to the light curable resin uncured and thus the light curable resin is cured to form a shaftlike core. According thereto, the optical waveguide and the optical device are connected by the core.

18 Claims, 7 Drawing Sheets

R-LED

G-PD

METHOD OF MANUFACTURING AN OPTICAL MODULE

This application is based on Japanese Patent Application No. 2004-164084 and 2005-095568, which are incorporated herein by reference.

BACKGROUND OF THE INVENTION

1. Field of the Invention

The present invention relates to an optical module that has a core fabricated using a light curable resin solution and light, and to a method of and an apparatus for manufacturing the optical module. The invention is applicable to an inexpensive and low-loss optical module for use in optical fiber communications, such as an optical transmitter and receiver, an optical interconnection device, and an optical branching filter or coupler.

2. Description of the Related Art

The inventors, together with their coinventors, have developed and applied for patent on an optical waveguide having a so-called self-forming type core. The self-forming type core forms the optical waveguide in the following manner. That is, for example, a liquid light curable resin uncured is irradiated with curing wavelength light in a beam form from an optical fiber. Thereby, only the resin in an optical path portion irradiated in the beam form is cured to form a shaftlike cured material (core). Thereafter, the core is surrounded by a lower refractive index resin for example, thus forming the optical waveguide (see JP-A-2002-365459). Besides, the following is shown by using two light curable resins different in refractive index and curing wavelength. That is, when only the resin on the high refractive index side is cured for a long time (see JP-A-2002-169038) and when only the resin on the low refractive index side is cured for a short time (see JP-A-2004-149579), the remaining resin solution uncured is thereafter cured, thereby making it possible to form two kinds of optical waveguides each having a specific refractive index distribution.

The technology related to the invention will be described using FIGS. 4A to 4E. FIGS. 4A to 4E are process diagrams showing a method of manufacturing an optical module having one light receiving device and one light emitting device.

As shown in FIG. 4A, an open-topped casing 91 made of transparent resin is prepared, and a core end face 921 of an optical fiber 92 is introduced into the inside of the casing 91 and then fixed by a fixing member 93. Next, a half mirror or dichroic mirror (wavelength selective mirror) 94 is fixed to the casing 91. The half mirror or dichroic mirror (wavelength selective mirror) 94 is fixed inclined at 45 degrees to the bottom surface of the casing 91. Thereafter, to form a core member, the inside of the casing 91 is filled with a high refractive index light curable resin solution 95 uncured.

Next, when the light curable resin solution 95 having filled the casing 91 from the end face 921 is irradiated with the curing wavelength light by the optical fiber 92, then a cured material 95c is formed as being shaftlike along the optical path of the light (FIG. 4B). Since the half mirror or dichroic mirror (wavelength selective mirror) 94 is used this time, the cured material 95c will have branches. Thereafter, the light curable resin solution 95 uncured is removed (FIG. 4C). Next, the inside of the casing 91 is filled with a low refractive index curable resin solution 96 uncured that is to provide a cladding. Light curing, heat curing, or any other method may be adopted to cure the curable resin solution 96. Thus, the curable resin solution 96 having filled the inside of the casing 91 is all cured into a cured material 96c, thereby forming optical waveguides, one of which has the high refractive index cured material 95c serving as the core and the other of which has the low refractive index cured material 96c serving as the cladding (FIG. 4D).

Thereafter, for example, a light emitting device 97 and a light receiving device 98 are attached to the vicinities of the junctions between the cured materials 95c serving as the cores and the casing 91 made of transparent resin. Thus, an optical module 900 capable of single-line two-way communication can be completed (FIG. 4E).

In the optical module 900 of FIG. 4E, the light emitting device 97 and the light receiving device 98 face the cured materials 95c serving as the cores via the casing 91 made of transparent resin. With such a structure, it turns out, the following problem arises when a life and a deterioration in characteristics as a module are evaluated based on a so-called acceleration test. That is, in the state where the load of normal humidity at 85° C. or 95% relative humidity at 75° C. is applied, it turns out, the bonding between the cured material 95c serving as the core and the optical device 97, 98 is deteriorated in several hours, so that a light transmission loss is lost on the order of 40%. This is caused mainly by separation of the cured resin from the casing.

SUMMARY OF THE INVENTION

Thereupon, the inventors have earnestly examined an optical module having a self-forming type core in a different configuration from those of FIGS. 4A to 4E and have finally completed the invention. That is, an object of the invention is to provide an optical module in which the bonding between a core made of cured resin and an optical device is not easily deteriorated.

To solve the aforesaid problem, according to the invention, a method of manufacturing an optical module comprises holding detachably the optical waveguide and at least one optical devic by a mold, holding an uncured light curable resin in the mold, emitting light of a wavelength for curing the light curable resin from a leading end of the optical waveguide to the light curable resin and curing the light curable resin to form a core, and connecting the optical waveguide and the optical device by the core. Besides, the method further comprises removing an uncured part of the light curable resin from a surface of the core, and covering the leading end of the optical waveguide, an exposed surface of the core, and the optical device with a cladding material. Besides, the mold is detached after the core is formed. Besides, the core is formed after at least one optical component such as a mirror, half mirror is held on the mold. Here, an optical waveguide that is manufactured by any method. Besides, in the case of a plurality of the optical devices, it is derived that the core requires the number of branches smaller by one than the number of the optical devices. Besides, any number of curved portions can also be formed by using the mirrors. In the case of one optical device, the number of mirrors, half mirrors, and other optical components may be zero. The optical devices refer to a light emitting device, a light receiving device, an optical modulator, a coupler, and other devices.

Besides, the uncured resin removal step is carried out after the optical waveguide, the any number of mirrors, half mirrors, and other optical components, the one or plurality of optical devices, and the waveguide, which is formed so as to integrally connect them together and is branched and/or bent according to need, are detached from the mold. As aforesaid, in the case of one optical device, the number of mirrors, half mirrors, and other optical components may be zero.

Besides, the cladding material includes a light curable or heat curable resin, and the exposed surface of the core is covered with the light curable or heat curable resin uncured, which resin is thereafter cured. Besides, the optical component and the optical device are fixed as the cladding material covers main portions thereof and as the cladding material covers a vicinity of the emitting end of the optical waveguide. Here, that the cladding material covers the main portions of the optical components and optical devices means that the cladding material covers them to a sufficient extent to fix them, and is not limited to the state in which the cladding material fully covers them.

Besides, an optical module comprises an optical waveguide, a core that is formed in a self-forming manner by light curing as light is emitted from a leading end of the optical waveguide, an optical device connected to an other end of the core, and a cladding that, made of resin cured to integrally cover the leading end of the optical waveguide, the core, and the optical device. Besides, polymerization of the core and the cladding material proceeds due to heating, and the contraction ratio of the cladding material is higher than that of the core.

Besides, the mold comprises an opening in the upper side thereof, and a drain port which is provided in a bottom of the mold to drain an uncured resin, wherein an end of the optical waveguide is inserted into the mold in a horizontal direction, and wherein a formed resin component and the optical waveguide is detached from the mold in a state where the resin component and the optical wavegude are held connected. Besides, the method of manufacturing an optical module further comprises inserting one end of the optical waveguide into the mold in a horizontal direction, putting the optical device into the mold through an opening of the mold and fix the optical device temporarily, introducing the light curable resin into the mold, emitting a light beam at a wavelength adapted to harden the curable resin, from an other end of the optical waveguide into the mold, thereby to form the core which extends from the one end of the optical waveguide inserted into the mold, to the optical device, opening a drain port in a bottom of the mold, draining an uncured part of the light curable resin from the drain port, releasing a temporary fixation of the optical device connected by the core, and introducing a cladding material into the mold, curing the cladding material, and taking a optical module having the optical waveguide and the optical device integrated by the cladding material out of the mold. Besides, the curable resin is introduced after any desired number of reflective mirrors, semitransparent mirrors or other optical components have been put into the mold through the opening of the mold and have been temporarily fixed. Here, in the case where the plurality of optical devices exist, it is derived that the core requires a branch or branches the number of which is smaller by one than that of the optical devices. Also, any desired number of bent portions can be formed by employing the mirror or mirrors. In the case of the single optical device, none of the reflective mirror, semitransparent mirror and other optical component may well be disposed. The "optical device" signifies a light emitting device, a light receiving device, a light modulating device, a photocoupler, or the like.

Besides, an apparatus for manufacturing an optical module of the invention comprises a mold which has an opening and is capable of draining an uncured resin from a drain port that is provided in a bottom of the mold, wherein one end of the optical waveguide is insertable into the mold in a horizontal direction, and a formed resin component and the optical waveguide are detachable from the mold in a state where the resin component and the optical waveguide are connected to each other, a jig for putting at least one optical device into the mold through the opening of the mold so as to temporarily fix the optical device, means for introducing a light curable resin for forming a core into the mold, means for guiding a light beam at a wavelength adapted to cure the light curable resin, from an other end of the optical waveguide into the mold, means for introducing a cladding material into the mold, and means for curing the cladding material, wherein the optical waveguide and the optical device are connected by a core formed from the light curable resin, and covered with the cladding material.

The invention makes it possible to provide an optical module that uses a self-forming type core, wherein the core and optical devices are not easily separated. According to the invention, the optical devices can be pre-aligned in position, so that the process is simplified, thus enabling a reduction in cost. Besides, since a resin reservoir for a curable resin for core formation and a mold for clad formation are made common, the process can be simplified. Besides, the core can be bonded directly to the optical devices and not via the casing, thus improving bonding efficiency, so that a device life can be lengthened and a deterioration in characteristics can be suppressed.

The detachable fixing member may be detached at any step, but when it is detached before the uncured resin removal step, the uncured resin can be properly removed. When the cladding material uses a light or heat curable resin, especially a liquid one, the core can be fully covered therewith, thus making it possible to restrain light from leaking through a core surface. The cladding material also covers the mirrors, half mirrors, and other optical components, the main portions of the optical devices, and the vicinity of the emitting end of the optical waveguide, thereby making it possible to provide a strong optical module that is difficult to break.

Besides, the core can be bonded directly to the optical devices and not via the casing, thus improving bonding efficiency, so that a device life can be lengthened and a deterioration in characteristics can be suppressed.

DETAILED DESCRIPTION OF THE PREFERRED EMBODIMENTS

Figure 1A:
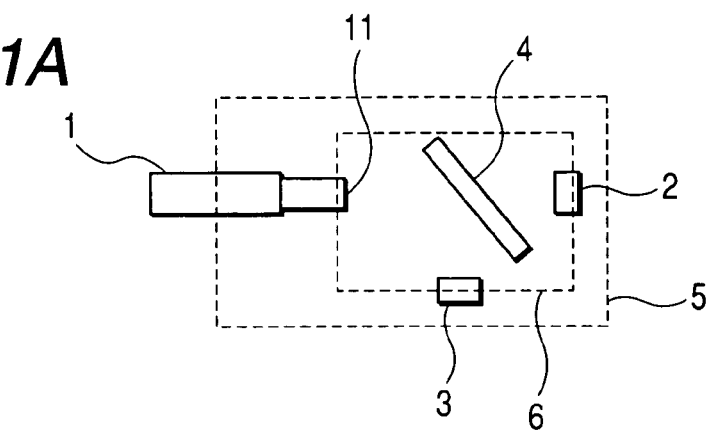
FIGS. 1A to 1D are process diagrams showing in conceptual form a manufacturing method of the invention

Any optical components, etc. can be used to put the invention into practice. The pre-formed optical waveguide can suitably use an optical fiber such as a plastic optical fiber (POF) or a glass optical fiber (GOF). Other than the so-called fiber-shaped optical waveguide, however, any optical waveguides capable of emitting light in a beam form as described later are acceptable regardless of their shape. When an optical waveguide whose cladding portion is easy to process is used out of them, as described later, the processed cladding portion of the POF is covered with a cladding material of a self-forming type optical waveguide, whereby it is easy to make it difficult that the POF comes off the optical module.

Any available light curable resin can be used to form the core. For example, in JP-A-2002-169058 and JP-A-2002-149579, light curable resins and polymerization initiators of radical polymerization type and cationic polymerization type are listed as examples in which they are used as two-component mixtures. However, any one kind of the light curable resins described in JP-A-2002-169038 and JP-A-2004-149579 can be used independently as the light curable resin for forming the core of this application. To reinforce the adhesion between the core end face of the optical fiber and the device surfaces of the optical devices, as described in JP-A-2002-365459, a silane coupling agent may be used by dissolving or dispersing it in a light curable resign solution. The cladding material can similarly use any one kind of the light curable resins and polymerization initiators described in JP-A-2002-169038 and JP-A-2004-149579, or otherwise may use a heat curable resin.

First Embodiment

FIGS. 1A to 1D are process diagrams showing in conceptual form a manufacturing method according to a first embodiment of the invention. First, a POF 1, a green PD (light receiving device) 2, a red LED (light emitting device) 3, and a wavelength selective mirror 4 are prepared. The method uses the wavelength selective mirror 4 that reflects red light and transmits green light. These optical components are disposed on a fixing member 5 to which are fixed a core end face 11 of the POF 1, a light receiving surface of the light receiving device 2, a light emitting surface of the light emitting device 3, and a reflective surface of the wavelength selective mirror 4, and from which the optical components are detachable. The fixing member 5 is configured such that a light curable resin solution 6 to provide a core can be disposed thereon between the core end face 11 of the POF 1 and the lower left surface of the wavelength selective mirror 4, between the upper right surface of the wavelength selective mirror 4 and the light receiving surface of the light receiving device 2, and between the lower left surface of the wavelength selective mirror 4 and the light emitting surface of the light emitting device 3. This configuration is conceptually shown as in FIG. 1A. The shape of the entire fixing member 5 and the shape of a portion thereof in which the light curable resin solution 6 is disposed, an example of which shapes will be described in FIG. 2 and the subsequent figures, are merely conceptually shown by broken lines in FIGS. 1A to 1D.

Figure 1B:
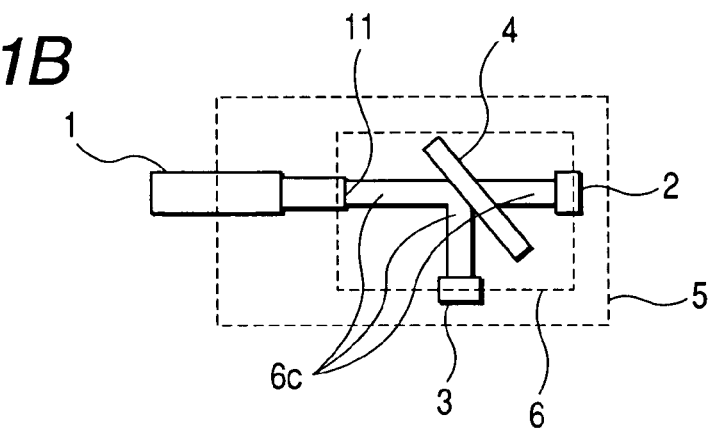

A POF having a core diameter of 980 µm and an NA of 0.30 is used as the POF 1. By using "UVX-4037" made by Toagosei Co., Ltd., which is an acrylic resin, as the light curable resin solution 6, a laser beam of 458 nm wavelength is irradiated into the light curable resin solution 6 from the POF 1, thereby forming a shaftlike cured material 6c that has branches in the vicinity of the wavelength selective mirror 4. The shaftlike cured material 6c is formed to provide connections between the core end face 11 of the POF 1 and the lower left surface of the wavelength selective mirror 4, between the upper right surface of the wavelength selective mirror 4 and the light receiving surface of the light receiving device 2, and between the lower left surface of the wavelength selective mirror 4 and the light emitting surface of the light emitting device 3 (FIG. 1B). The factor of curing into a shaftlike form lies in that the light curable resin solution 6 is increased in refractive index by curing. In fact, the "UVX-4037" has a refractive index of 1.471 before curing and a refractive index of 1.491 after curing.

Figure 1C:
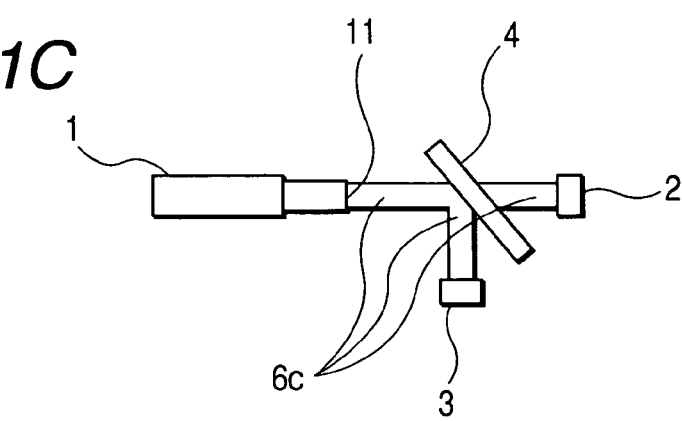
Figure 1D:
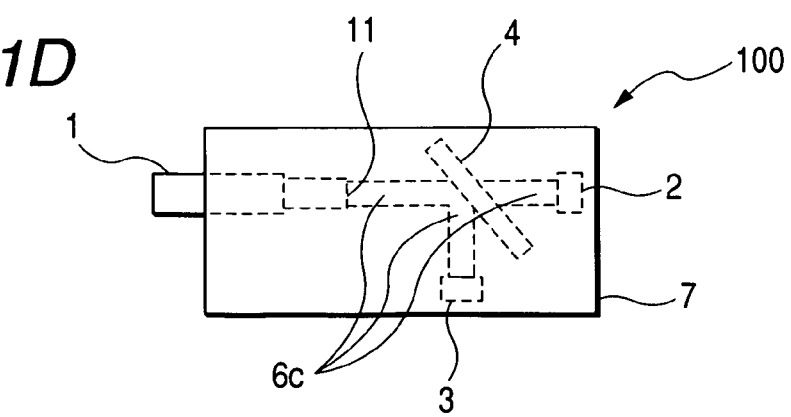

Thereafter, the fixing member 5 is detached and the light curable resin solution 6 uncured is removed (FIG. 1C). Thereafter, the formed module main portion is put in another mold for example, and the surrounding area thereof is covered with a cladding material 7, which is cured. Thereby, an optical module 100 capable of single-line two-way communication can be formed with ease. Incidentally, "OP-38ZT", which, made by Dainippon Ink and Chemicals, Inc., is a light curable fluorinated acrylic resin, is used as the cladding material 7. The "OP-38ZT" has a refractive index of 1.380 after curing.

Figure 2A:
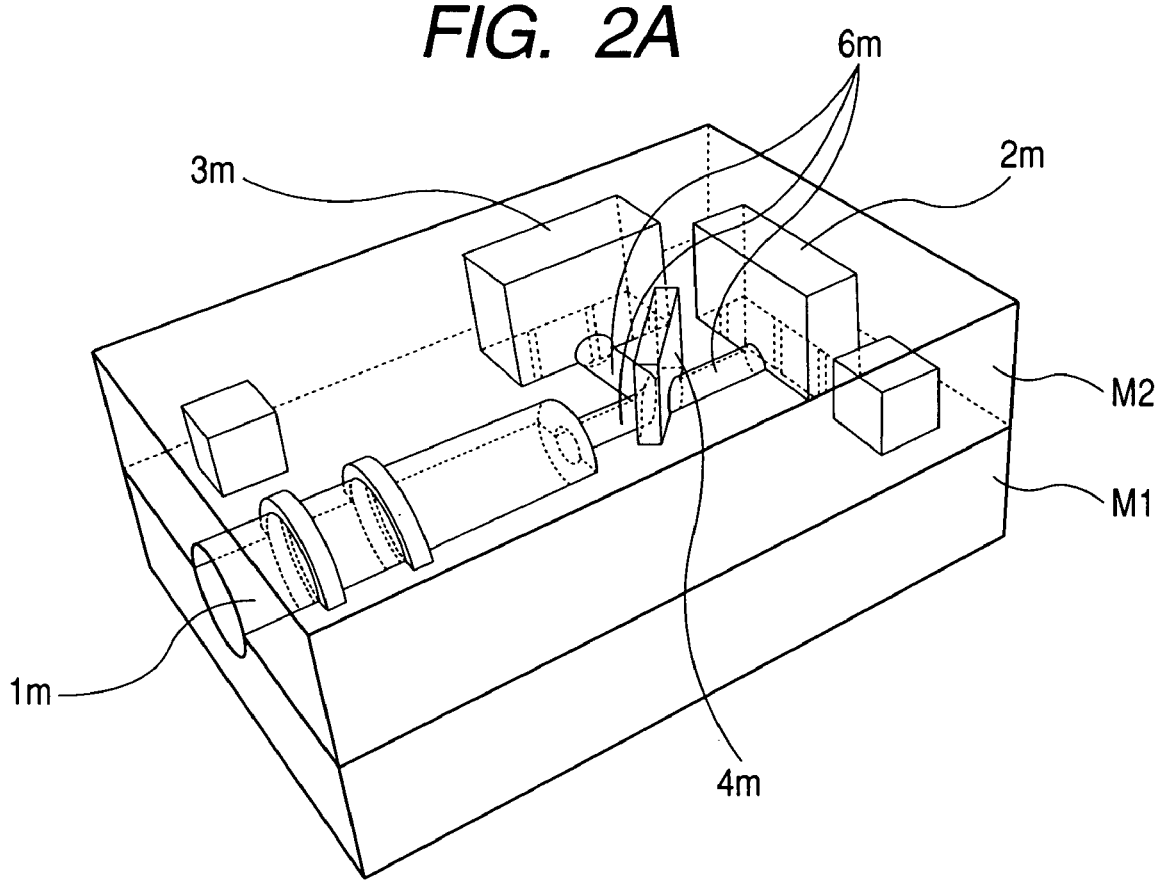
FIG. 2A is a perspective oblique view showing a fixing member configured of two mold forms.

A combination of upper and lower two mold forms M1 and M2 as shown in FIG. 2A is adopted as the fixing member 5. When the mold forms M1 and M2 are combined together, a portion 1m for fixing the POF 1, a portion 2m for fixing the light receiving device 2, a portion 3m for fixing the light emitting device 3, a portion 4m for fixing the wavelength selective mirror 4, and a portion 6m to be filled with the light curable resin solution 6 are formed as a continuous cavity. For example, since the shaftlike core 6c can be formed to have a diameter of 1 µm, the portion 6m to be filled with the light curable resin solution 6 is set to the size of the order of 2 µm in diameter. The reason is that, since the invention is not of injection molding type, the diameter of the portion 6m to be filled with the light curable resin solution 6 need be set larger than the designed diameter of the shaftlike core 6.

Figure 2B:
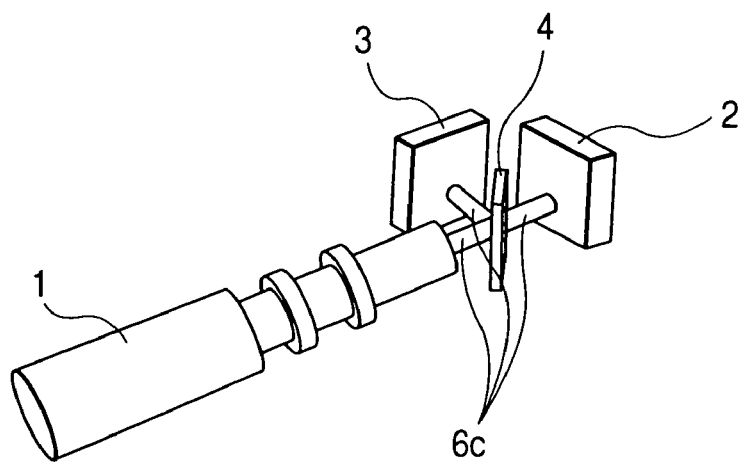
FIG. 2B is an oblique view showing an optical module main portion having optical components connected by a core 6c made of a cured light curable resin.

By using the fixing member 5 as shown in FIG. 2A, the core 6c is formed according to the process diagram of FIGS. 1A to 1D, which then results in formation of an optical module main portion as shown in FIG. 2B. It is apparent that the configuration of FIG. 2B is the same as that of FIG. 1C. In FIG. 2A, the cladding portion of the POF 1 is processed into a two-step flangelike form in order to prevent the POF 1 from coming off. This processing works effectively both when the POF 1 is fixed to the fixing member 5 as shown in FIG. 2A and when the entire module is covered with the cladding material shown in FIG. 1D, thus making it possible to prevent the POF 1 from coming off.

Figure 3A:
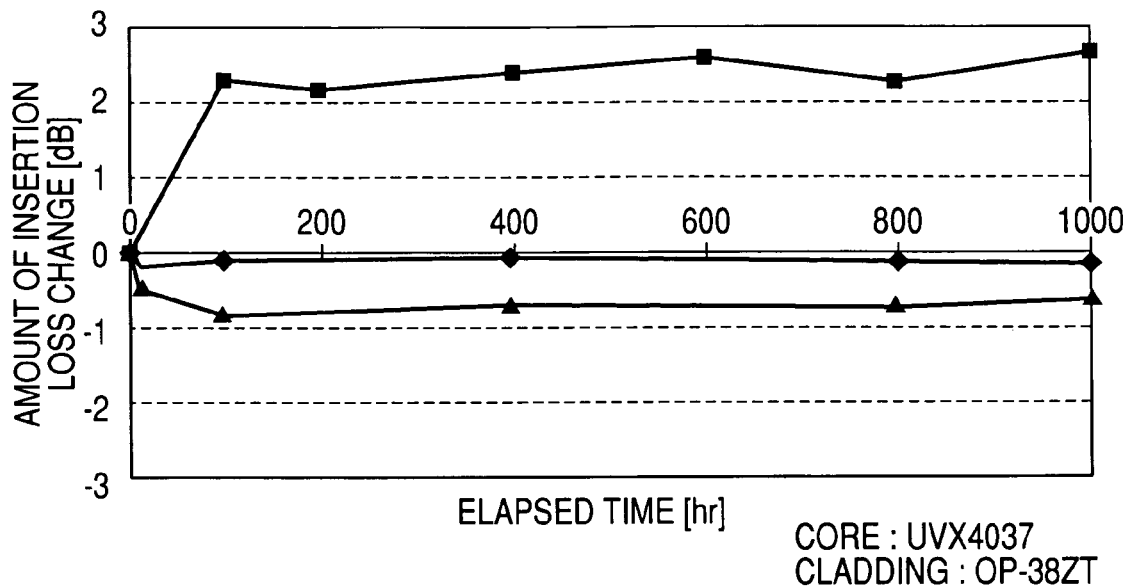
FIG. 3A is a graph chart showing a change in optical characteristics resulting from an acceleration test on bonding to a light emitting device.
Figure 3B:
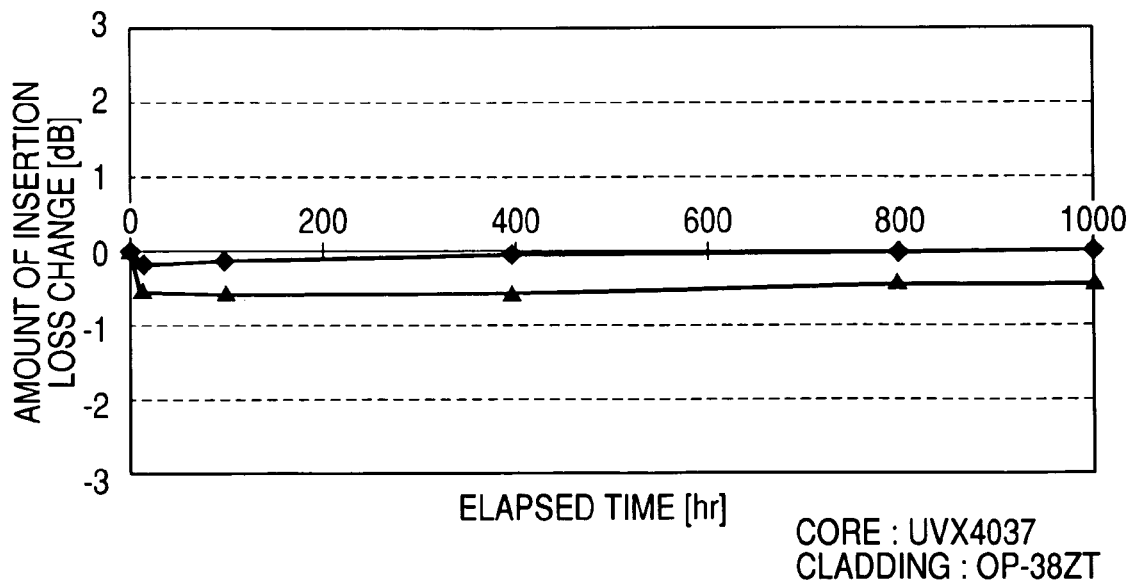
FIG. 3B is a graph chart showing a change in optical characteristics resulting from an acceleration test on bonding to a light receiving device.
Figure 4A:
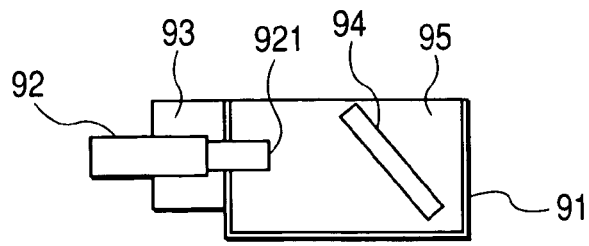
FIGS. 4A to 4E are process diagrams showing an optical module manufacturing method described in JP-A-2002-365459.
Figure 4B:
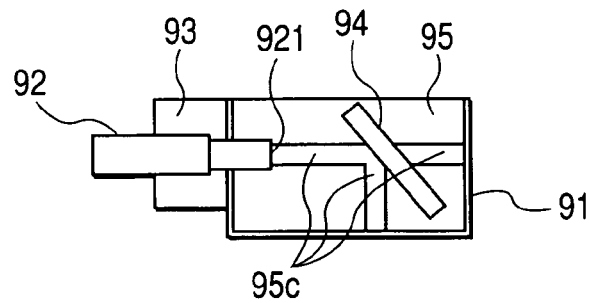
Figure 4C:
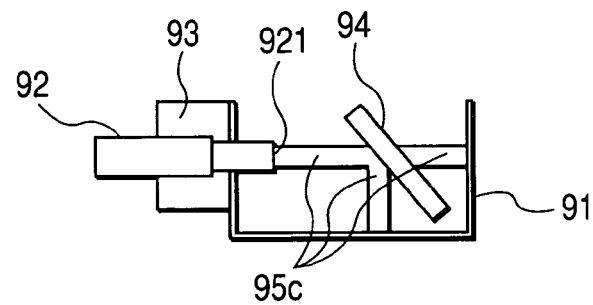
Figure 4D:
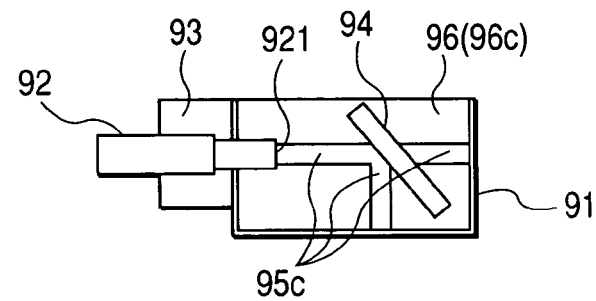
Figure 4E:
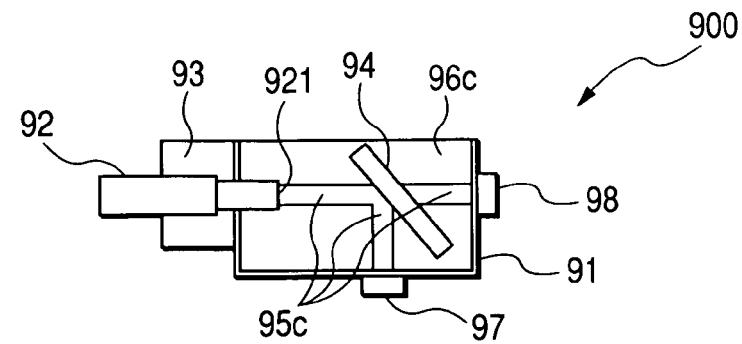

As a comparative example of the optical module 100 of the invention formed as aforesaid, according to the process of FIGS. 4A to 4E, a POF 91, a red LED 97, a green PD 98, and a wavelength selective mirror 94 are prepared as the same optical components, and an optical module 900 is formed using the "UVX-4037" as a core and the "OP-38ZT" as a cladding. Then, an acceleration test is performed to the optical module 100 and the optical module 900, thus evaluating a change in optical characteristics. The results are shown in FIGS. 3A and 3B. The vertical axis of FIGS. 3A and 3B indicates 0 in the condition before the acceleration test, a positive when an optical loss occurs, and a negative when a gain occurs.

As shown in FIG. 3A, as for red light from the red LED 3, 97 to the POF 1, 91, in the optical module 100 of the invention, there is almost no change in optical characteristics at normal humidity at 85° C. On the contrary, in the conventional optical module 900, the optical characteristics deteriorate 2 dB or more at normal humidity at 85° C. (a 40% decrease in the amount of light). Besides, in the optical module 100 of the invention, a gain occurs at 95% relative humidity at 75° C. The reason seems to be that heating allows polymerization to proceed in both the core 6c and the cladding 7, thus improving the bonding to the red LED 3. Besides, as shown in FIG. 3B, the green LED 2 is also similar in the change of optical characteristics to the red LED 3. Thus, according to the invention, it is possible to easily provide the optical module in which no separation between the core and the optical device occurs due to heating and no deterioration in characteristics occurs.

The gain is considered to occur at 95% relative humidity at 75° C. for various reasons and, for example, there is the following possibility. First, the core 6c is in the state where it includes some amount of unpolymerized material when being cured and formed in a self-forming manner. Next, when the cladding material 7 is light-cured, the unpolymerized material of the core 6c is polymerized. On the contrary, the cladding material 7, merely light-cured, is still in the state where it includes an unpolymerized material. When the optical module 100 in such a state is placed in a heated state, curing of the cladding material 7 proceeds. Thereby, the contraction in volume of the cladding material 7 by polymerization of the unpolymerized material is made larger than that of the core 6c by polymerization of the remaining unpolymerized material. Thus, it is highly possible that compressive stress occurs between the core and the optical device.

The aforesaid embodiment shows an example in which the combination of upper and lower two mold forms M1 and M2 provides the fixing member 5, which is detached at the uncured resin removal step. However, the fixing member of the invention is not limited to this configuration. The combinational fixing member can be modified in various ways so as to be capable of easy conception. For example, the configuration may be such that the mold forms used to cure the core 6c are used in curing the cladding material. In the aforesaid embodiment, to suppress the consumption of the light curable resin forming the core, the portion 6m to be filled with the light curable resin solution 6 is made small in volume. However, as shown in the conceptual diagram of FIG. 1A, the portion 6m may be large in volume.

The aforesaid embodiment shows an example in which the optical components are not positionally aligned in the fixing member 5. Alternatively, the configuration may be such that the optical components are positionally aligned using an optical jig. The aforesaid embodiment uses one wavelength selective filter, one light emitting device, and one light receiving device. Alternatively, the optical module may be configured in the following manners by using a plurality of the wavelength selective filters. That is, light from any number of light emitting devices is collected and led to the POF etc. through the wavelength selective filters. Besides, incident light is branched through the wavelength selective filters, from the POF etc. to any number of light receiving devices, by selecting or not selecting a wavelength.

Second Embodiment

FIGS. 5A to 5D are process diagrams showing in conceptual form a manufacturing method according to a second embodiment of the invention. First, a POF 1, a green PD 2, a red LED 3, and a wavelength selective mirror 4 are prepared. The method uses the wavelength selective mirror 4 that reflects red light and transmits green light. The individual components are arranged within a mold 105 in such a way that the core end face 11 of the POF 1 is fixed by the mold 105, and that the light receiving face of the light receiving device 2, the light emitting face of the light emitting device 3 and the reflective surface of the wavelength-selective mirror 4 are temporarily fixed by jigs not shown. By the way, whereas FIG. 4 depicts side views showing the process in a horizontal direction, the respective views of FIG. 5 are side views showing the process from above. Within the mold 105 indicated by a broken line in FIG. 5, a curable resin liquid 6 to become a core could be arranged. Incidentally, as will be indicated below, the core 6c to be hardened and formed in self-forming fashion is formed between the core end face 11 of the POF 1 and the left lower surface of the wavelength-selective mirror 4, between the right upper surface of the wavelength-selective mirror 4 and the light receiving face of the light receiving device 2, and between the left lower surface of the wavelength-selective mirror 4 and the light emitting face of the light emitting device 3. This configuration is conceptually shown as in FIG. 5A. The shape of the entire mold 105 and the shape of a portion thereof in which the light curable resin solution 6 is disposed, an example of which shapes will be described in FIG. 6 and the subsequent figures, are merely conceptually shown by broken lines in FIGS. 5A to 5D.

Figure 5A:
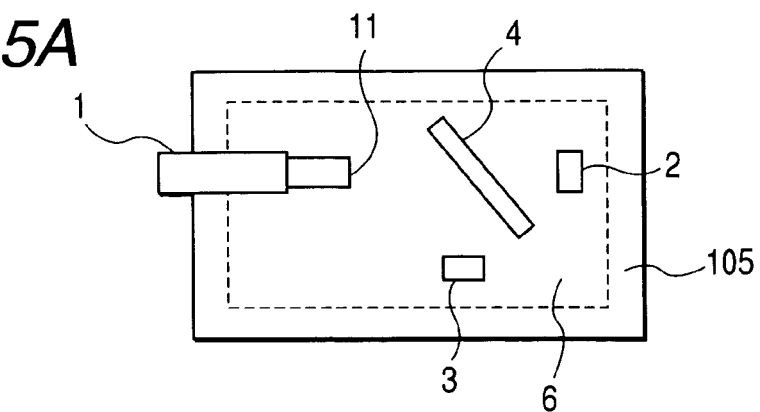
FIGS. 5A to 5D are process diagrams (plan views) showing in conceptual form a manufacturing method of the invention.
Figure 5B:
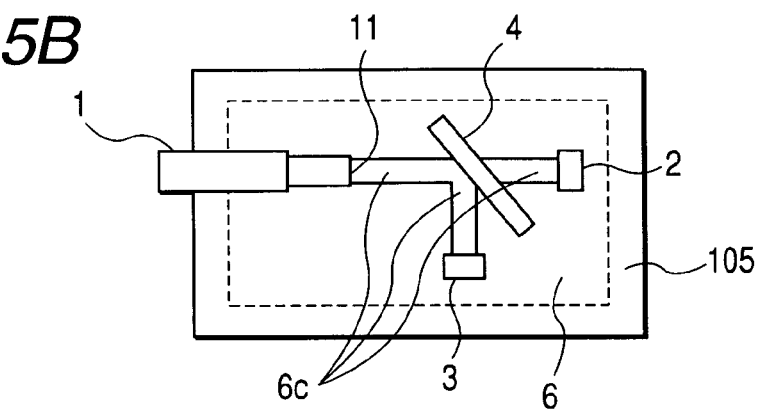

A POF having a core diameter of 980 μm and an NA of 0.30 is used as the POF 1. By using "UVX-4037" made by Toagosei Co., Ltd., which is an acrylic resin, as the light curable resin solution 6, a laser beam of 458 nm wavelength is irradiated into the light curable resin solution 6 from the POF 1, thereby forming a shaftlike cured material 6c that has branches in the vicinity of the wavelength selective mirror 4. The shaftlike cured material 6c is formed to provide connections between the core end face 11 of the POF 1 and the lower left surface of the wavelength selective mirror 4, between the upper right surface of the wavelength selective mirror 4 and the light receiving surface of the light receiving device 2, and between the lower left surface of the wavelength selective mirror 4 and the light emitting surface of the light emitting device 3 (FIG. 5B). The factor of curing into a shaftlike form lies in that the light curable resin solution 6 is increased in refractive index by curing. In fact, the "UVX-4037" has a refractive index of 1.471 before curing and a refractive index of 1.491 after curing.

Figure 5C:
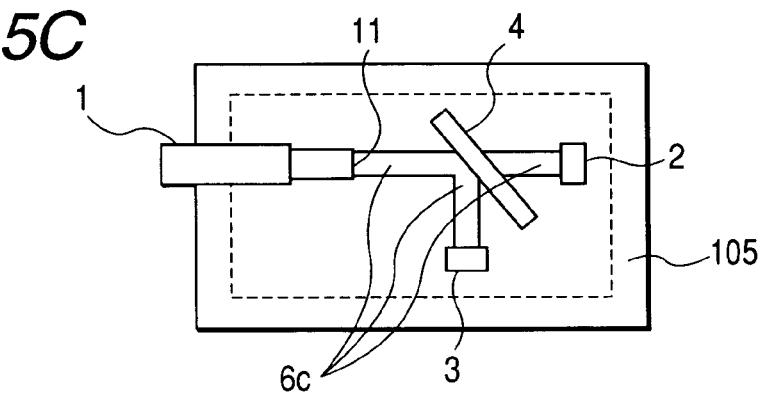
Figure 5D:
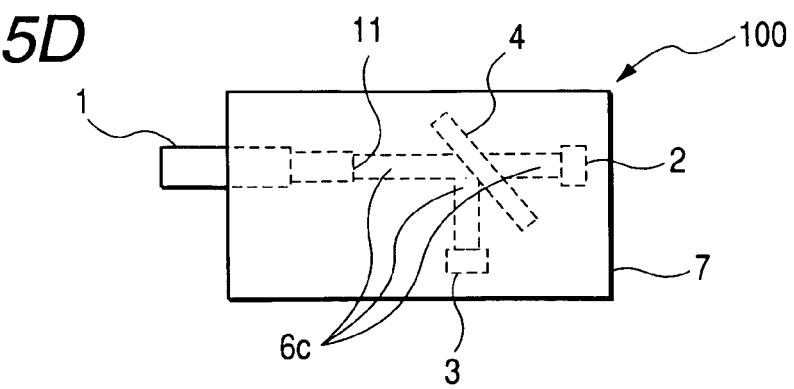

Thereafter, a drain port in the bottom of the mold 105 is opened and the light curable resin solution 6 uncured is removed (FIG. 5C). Thereafter, the mold 105 is washed, and is filled up with a clad material 7, which is subsequently hardened. In this way, an optical module 100 capable of single-wire two-way optical communications can be formed with ease (FIG. 5D). Incidentally, "OP-38ZT", which, made by Dainippon Ink and Chemicals, Inc., is a light curable fluorinated acrylic resin, is used as the cladding material 7. The "OP-38ZT" has a refractive index of 1.380 after curing.

Figure 6:
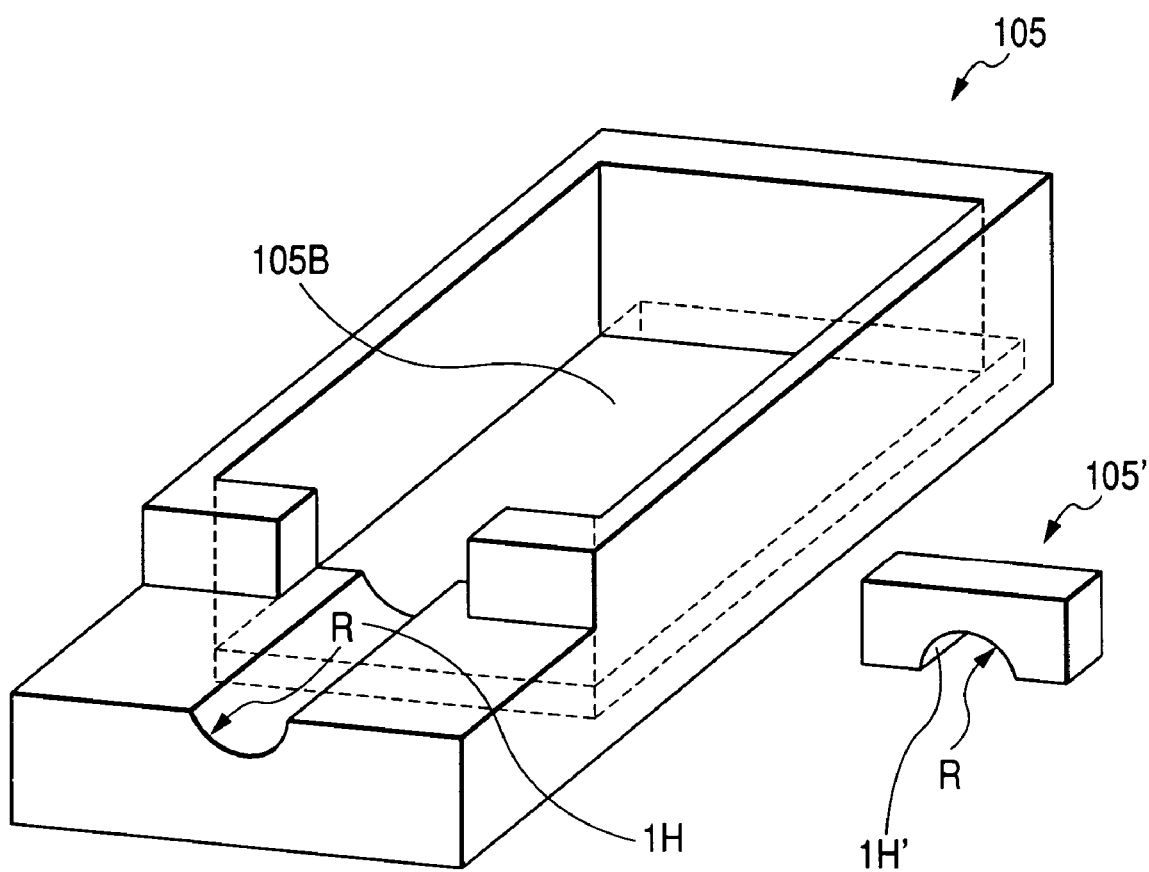
FIG. 6 is a perspective view showing an example of a mold for use in the invention.

Usable as the mold 105 is a substantially rectangular one which has no top surface and has an opening above as shown in FIG. 6. The mold 105 is so constructed that the bottom 105B is slidable in the lengthwise direction of this mold, and that a bottom surface inside this mold can be entirely opened. A part 105' of the front surface of the mold 105 is detachable. The front surface of the mold 105 is provided with a recess 1H in the shape of the side surface of a semicircular column, and it forms a support portion for the POF 1 together with the recess 1H' of the part 105' in the shape of the side surface of the semicircular column. The columnar side surfaces of the recesses 1H and 1H' define a columnar side surface of radius R, and this columnar side surface is formed so as to agree with the outer peripheral surface of the POF 1. Besides, the mold 105 and its part 105' have their connection surfaces formed into a packing, and when they are combined, the resin liquid filling up the interior of the mold 105 is prevented from leaking out.

Figure 7A:
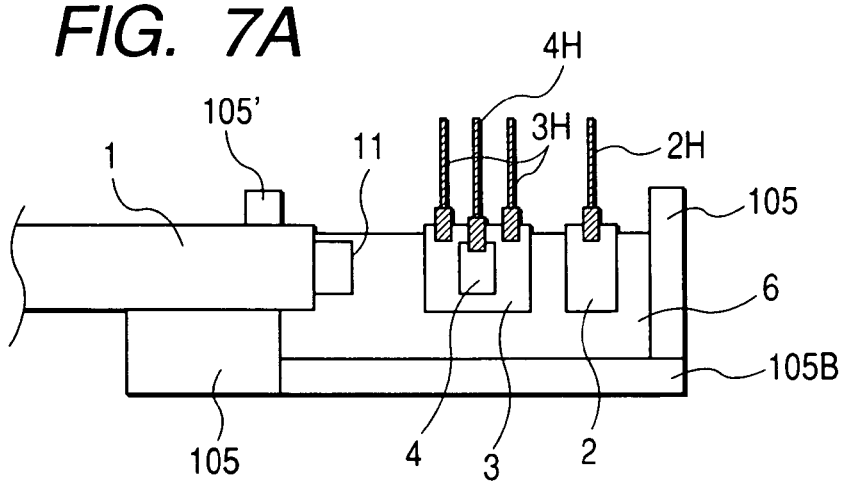
FIGS. 7A to 7C are process diagrams (side views) showing some steps of the manufacturing method in the case of using the mold in FIG. 2.

A process chart in the case of employing the mold 105 in FIG. 6 is illustrated as side views (sectional views). FIG. 7A shows a state where the bottom 105B of the mold 105 is closed, where the POF 1 is fixed by the detachable part 105', where the green PD 2, red LED 3 and wavelength-selective mirror 4 are temporarily fixed by the respective jigs 2H, 3H and 4H, and where the mold 105 is filled up with the unhardened curable resin 6. FIG. 7A corresponds to FIG. 5A. Incidentally, the wiring electrodes of the green PD 2 and red LED 3 are omitted from illustration.

Figure 7B:
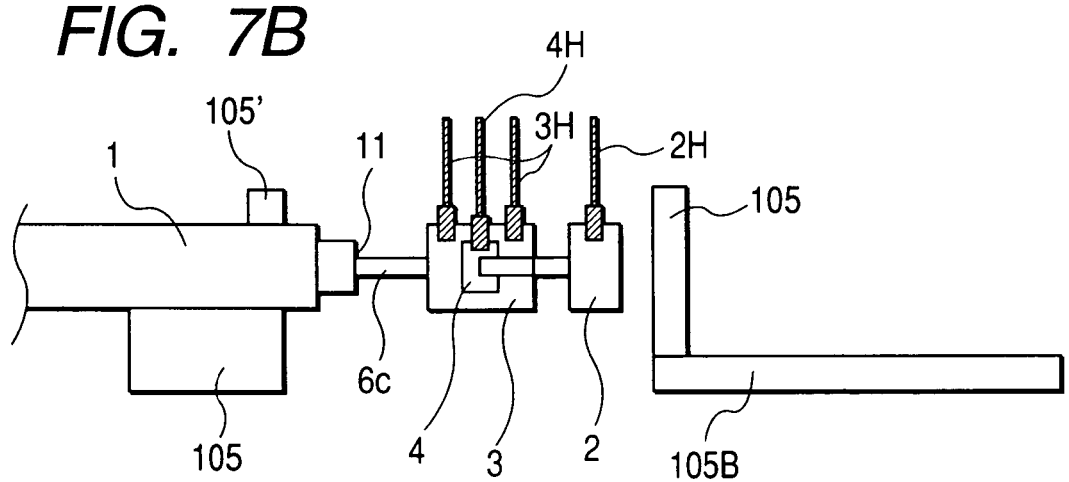

FIG. 7B shows a state where the bottom 105B of the mold 105 is slid and opened, and where the unhardened resin is removed. FIG. 7B corresponds to FIG. 5C.

Figure 7C:
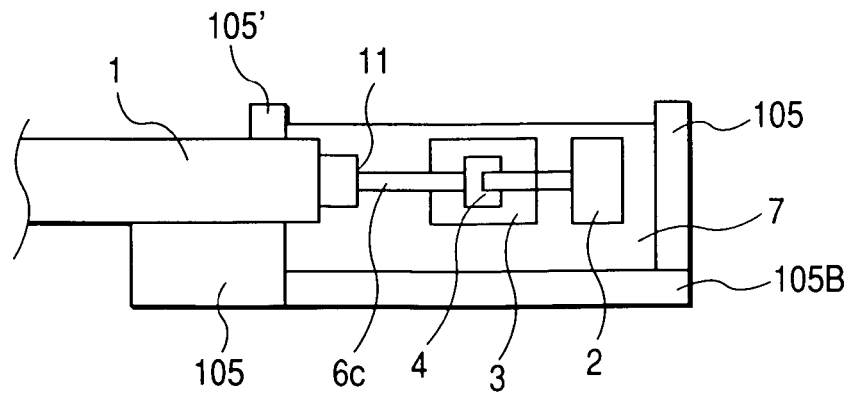

FIG. 7C shows a state where the bottom 105B of the mold 105 is slid and closed, and where this mold is filled up with the clad material 7. When the clad material 7 is hardened in the state of FIG. 7C, the optical module 100 in FIG. 5D could be formed. The detachable part 105' is detached as shown in FIG. 6, whereby the optical module 100 could be easily taken out of the mold 105.

In the above example, the mold 105 whose bottom 105B is slidable is employed, but the mold may be provided with means capable of removing the unhardened curable resin, in its bottom. Incidentally, an alternative drain port may well be in such a shape that the unhardened curable resin is drawn out upwards from a nozzle. The jigs for the temporary fixations may be any articles which can position the optical devices and optical component. These jigs may be demounted either in advance of the removal of the unhardened curable resin, or midway of filling up the mold 105 with the clad material 7.

The above example included one wavelength-selective filter, and one light emitting device as well as one light receiving device. It is also allowed, however, to construct an optical module in which a plurality of wavelength-selective filters are employed, whereby lights from any desired number of light emitting devices are collected and guided to a POF or the like, or input light is branched from a POF or the like into any desired number of light receiving devices with or without the selection of wavelengths.

In case of constructing an optical module in which a green LED and a red PD are respectively substituted for the green PD 2 and red LED 3 of the foregoing optical module 100, and employing these optical modules in combination, a two-way optical communications module in which lights of two wavelengths are separately used for up and down communications can be formed with ease. Incidentally, the wavelength characteristics of the light receiving devices and light emitting devices and those of the wavelength-selective mirrors can be selected and applied at will.

What is claimed is:

1. A method of manufacturing an optical module comprising:
    inserting an end of an optical waveguide into a mold in a horizontal direction;
    putting at least one optical device into the mold through an opening of the mold;
    holding detachably an optical waveguide and the at least one optical device by a mold, the optical waveguide and the at least one optical device being held separately from each other by the mold at a fixed distance;
    introducing an uncured light curable resin into the mold and holding the uncured light-curable resin in the mold;
    emitting a light beam at a wavelength adapted to harden the curable resin, from an other end of the optical waveguide into the mold, thereby to form a core which extends from the end of the optical waveguide inserted into the mold, to the at least one optical device;
    connecting the optical waveguide by the core directly to the at least one optical device held by the mold;
    opening a drain port in a bottom of the mold, to drain an uncured part of the light curable resin from the drain port;
    releasing said at least one optical device connected by the core from the mold, and introducing a cladding material into the mold;
    curing the cladding material; and
    removing an optical module including the optical waveguide and the at least one optical device integrated by the cladding material out of the mold,
    wherein the optical device comprises at least one of a light emitting device, a light receiving device, a light modulating device and a photo-coupler.

2. The method of manufacturing an optical module according to claim 1, further comprising:
    removing an uncured part of the light curable resin to expose a surface of the core; and
    covering the leading end of the optical waveguide, the surface of the core, and the at least one optical device with said cladding material.

3. The method of manufacturing an optical module according to claim 2, further comprising detaching the mold from the optical waveguide and the at least one optical device after the core is formed.

4. The method of manufacturing an optical module according to claim 1, wherein the core is formed after at least one optical device is held on the mold.

5. The method of manufacturing an optical module according claim 2, wherein the cladding material includes one of a light curable and a heat curable resin, and the exposed surface of the core is covered with the one of the light curable and the heat curable resin uncured, which resin is thereafter cured.

6. The method of manufacturing an optical module according to claim 4, wherein the at least one optical device is fixed as the cladding material covers main portions thereof and as the cladding material covers a vicinity of an emitting end of the optical waveguide.

7. The method of manufacturing an optical module according to claim 1, wherein the mold comprises:
    an opening in the upper side thereof.

8. The method of manufacturing an optical module according to claim 7, wherein the curable resin is introduced after any desired number of one of reflective mirrors and semi-transparent mirrors have been put into the mold through the opening of the mold and have been temporarily fixed.

9. The method of manufacturing an optical module according to claim 1, wherein the optical waveguide comprises an optical fiber.

10. The method of manufacturing an optical module according to claim 1, wherein said at least one optical device further comprises one of a mirror and a half mirror.

11. A method of manufacturing an optical module comprising:
    inserting an end of an optical waveguide into a mold in a horizontal direction;
    putting at least one optical device into the mold through an opening of the mold;

holding detachably an optical waveguide and the at least one optical device by a mold, the optical waveguide and the at least one optical device being held separately from each other by the mold at a fixed distance;

introducing an uncured light curable resin into the mold and holding the uncured light-curable resin in the mold;

emitting a light beam at a wavelength adapted to harden the curable resin, from an other end of the optical waveguide into the mold, thereby to form a core which extends from the end of the optical waveguide inserted into the mold, to the at least one optical device;

directly bonding the core to the at least one optical device held by the mold;

opening a drain port in a bottom of the mold, to drain an uncured part of the light curable resin from the drain port;

releasing said at least one optical device connected by the core from the mold, and introducing a cladding material into the mold;

curing the cladding material; and removing an optical module including the optical waveguide and the at least one optical device integrated by the cladding material out of the mold.

12. The method of manufacturing an optical module according to claim 11, wherein the core is formed after the at least one optical device is held on the mold.

13. The method of manufacturing an optical module according to claim 11, further comprising detaching the mold from the optical waveguide and the at least one optical device after the core is bonded to the at least one optical device.

14. The method of manufacturing an optical module according to claim 11, further comprising:

removing an uncured portion of the light-curable resin to expose a surface of the core; and covering the leading end of the optical waveguide, the surface of the core, and the at least one optical device with said cladding material.

15. A method of manufacturing an optical module comprising:

inserting an end of an optical waveguide into a mold in a horizontal direction;

putting at least one optical device into the mold through an opening of the mold;

holding detachably an optical waveguide and the at least one optical device by a mold, the optical waveguide and the at least one optical device being held separately from each other by the mold at a fixed distance;

introducing an uncured light curable resin into the mold and filling the mold with the uncured light-curable resin;

emitting a light beam at a wavelength adapted to harden the curable resin, from an other end of the optical waveguide into the mold, thereby to form a core which extends from the end of the optical waveguide inserted into the mold, to the at least one optical device;

directly bonding the core to the at least one optical device held by the mold;

opening a drain port in a bottom of the mold, to drain an uncured part of the light curable resin from the drain port;

releasing said at least one optical device connected by the core from the mold, and introducing a cladding material into the mold;

curing the cladding material; and removing an optical module including the optical waveguide and the at least one optical device integrated by the cladding material out of the mold.

16. The method of manufacturing an optical module according to claim 1, wherein the optical device further comprises at least one of a half mirror and a wavelength selective mirror.

17. The method of manufacturing an optical module according to claim 11, wherein the optical device comprises at least one of a half mirror and a wavelength selective mirror.

18. The method of manufacturing an optical module according to claim 15, wherein said optical device comprises at least one of a half mirror and a wavelength selective mirror.

* * * * *